United States Patent
Lienhard et al.

(10) Patent No.: US 9,751,047 B2
(45) Date of Patent: Sep. 5, 2017

(54) HYDROPHOBIC AIR-GAP MEMBRANE DISTILLATION

(71) Applicant: Massachusetts Institute of Technology, Cambridge, MA (US)

(72) Inventors: John H. Lienhard, Lexington, MA (US); David Elan Martin Warsinger, Potomac, MD (US); Jaichander Swaminathan, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/517,342

(22) Filed: Oct. 17, 2014

(65) Prior Publication Data
US 2016/0107121 A1 Apr. 21, 2016

(51) Int. Cl.
*B01D 61/36* (2006.01)
*C02F 1/44* (2006.01)
(Continued)

(52) U.S. Cl.
CPC ......... *B01D 61/364* (2013.01); *B01D 1/0035* (2013.01); *B01D 3/145* (2013.01);
(Continued)

(58) Field of Classification Search
CPC .... B01D 61/364; B01D 61/366; B01D 61/36; B01D 3/145; B01D 69/02;
(Continued)

(56) References Cited

U.S. PATENT DOCUMENTS

| 3,340,186 A | 9/1967 | Weyl et al. |
| 4,818,345 A * | 4/1989 | Jonsson .............. B01D 61/364 |
| | | 159/DIG. 27 |

(Continued)

FOREIGN PATENT DOCUMENTS

| CN | 102491577 A | 6/2012 |
| CN | 102989322 A | 3/2013 |

(Continued)

OTHER PUBLICATIONS

Saffarini, R., et al. "Technical evaluation of stand-alone solar powered membrane distillation systems," Desalination, 286: 332-341 (2012).*

(Continued)

*Primary Examiner* — Katherine Zalasky
*Assistant Examiner* — Benjamin Lebron
(74) *Attorney, Agent, or Firm* — Modern Times Legal; Robert J. Sayre

(57) ABSTRACT

An energy-efficient liquid-gap distillation apparatus includes a source of a feed liquid; a distillation module comprising: (a) a feed-liquid chamber n fluid communication with the feed-liquid source to establish a flow of the feed liquid there through, wherein the feed-liquid chamber includes a selectively porous material that allows a component of the feed liquid to pass through the selectively porous material and exit the feed-liquid chamber in vapor form but not in liquid form; (b) a condensing surface maintained at a lower temperature than the feed liquid in the feed-liquid chamber, wherein the condensing surface is sufficiently hydrophobic to produce a contact angle with water of at least 150; and (c) a gap between the selectively porous material and the condensing surface. Vapor passing through the membrane can be condensed as jumping droplets at the condensing surface.

26 Claims, 7 Drawing Sheets

(51) Int. Cl.
*B01D 1/00* (2006.01)
*F28F 13/04* (2006.01)
*B01D 69/02* (2006.01)
*B01D 3/14* (2006.01)
*C02F 103/08* (2006.01)

(52) U.S. Cl.
CPC .......... *B01D 61/36* (2013.01); *B01D 61/366* (2013.01); *B01D 69/02* (2013.01); *C02F 1/44* (2013.01); *C02F 1/447* (2013.01); *F28F 13/04* (2013.01); *B01D 2311/103* (2013.01); *B01D 2313/22* (2013.01); *B01D 2313/38* (2013.01); *B01D 2325/36* (2013.01); *B01D 2325/38* (2013.01); *C02F 2103/08* (2013.01); *C02F 2201/002* (2013.01); *Y02W 10/37* (2015.05)

(58) Field of Classification Search
CPC .......... B01D 2311/103; B01D 2313/22; B01D 2313/38; B01D 2325/36; B01D 2325/38; B01D 1/0035; C02F 1/447; C02F 1/44; C02F 2201/002; C02F 2103/08; Y02W 10/37; F28F 13/04
See application file for complete search history.

(56) References Cited

U.S. PATENT DOCUMENTS

| | | | | |
|---|---|---|---|---|
| 6,044,843 A * | 4/2000 | O'Neil | ............. | A61M 16/08 128/204.23 |
| 6,365,051 B1 | 4/2002 | Bader | | |
| 6,716,355 B1 | 4/2004 | Hanemaaijer et al. | | |
| 7,459,084 B2 * | 12/2008 | Baig | ............. | B01D 53/22 210/175 |
| 7,871,520 B2 * | 1/2011 | Ma | ............. | B01D 3/06 203/10 |
| 8,287,735 B2 * | 10/2012 | Hanemaaijer | ......... | B01D 1/0035 202/176 |
| 8,668,812 B2 | 3/2014 | Simpson et al. | | |
| 2006/0108286 A1 | 5/2006 | Hambitzer et al. | | |
| 2010/0096113 A1 * | 4/2010 | Varanasi | ............. | F28F 13/187 165/133 |
| 2010/0176057 A1 * | 7/2010 | Karnik | ............. | B01D 61/364 210/640 |
| 2010/0282680 A1 | 11/2010 | Su Ming et al. | | |
| 2011/0017431 A1 * | 1/2011 | Yang | ............. | F28D 15/046 165/104.26 |

FOREIGN PATENT DOCUMENTS

| | | |
|---|---|---|
| WO | 2012/100318 A1 | 8/2012 |
| WO | 2013/130955 A1 | 9/2013 |
| WO | 2013/158453 A1 | 10/2013 |
| WO | 2013151498 A1 | 10/2013 |
| WO | 2013/184559 A1 | 12/2013 |
| WO | 2013/188450 A1 | 12/2013 |

OTHER PUBLICATIONS

Zhang, J., et al. "Identification of material and physical features of membrane distillation membranes for high performance desalination," Journal of Membrane Science, 349: 295-303 (2010).*
N. Miljkovic, et al., "Condensation heat transfer on superhydrophobic surfaces", 38 MRS Bulletin 397 (May 2013).
R. Enright, et al., "Condensation on superhydrophobic copper oxide nanostructures", 135 J. Heat Transfer 091304 (Jul. 26, 2013).
R. Enright, et al., "Condensation on Superhydrophobic Surfaces: The Role of Local Energy Barriers and Structure Length Scale", 28 Langmuir 1424-1432 (Aug. 29, 2012).
J. Gilron, et al., "Design for Cascade of Crossflow Direct Contact Membrane Distillation", 46 Ind. Eng. Chem. Res. 2324-2334 (Mar. 16, 2007).
A. Alkhudhiri, et al., "Membrane distillation: A comprehensive review", 287 Desalination 2-18 (Sep. 16, 2011).
A.M. Alklaibi, et al., "Membrane-distillation desalination: status and potential", 171 Desalination 111-131 (2004).
M. Khayet, "Membranes and theoretical modeling of membrane distillation: A review", 164 Advances in Colloidal and Interface Science 56-88 (Nov. 10, 2010).
S. Kim, et al., "Dropwise Condensation Modeling Suitable for Superhydrophobic Surfaces", 133 J. Heat Transfer 081502 (Aug. 2011).
K. Lawson, et al., "Review: Membrane distillation", 124 J. Membrane Science 1-25 (1997).
N. Miljkovic, et al., "Modeling and Optimization of Superhydrophobic Condensation", 135 J. Heat Transfer 111004 (Nov. 2013).
D. Quere, "Wetting and Roughness", 38 Annu. Rev. Mater. Res. 71-99 (Apr. 7, 2008).
E. Summers, "Development of Energy Efficient Membrane Distillation Systems", Ph.D Thesis, Massachusetts Institute of Technology (Jun. 2013).
E. Summers, et al., "Energy efficiency comparison of single-stage membrane distillation (MD) desalination cycles in different configurations", 290 Desalination 54-66 (Feb. 15, 2012).
U.S. International Search Report and Written Opinion for PCT/US15/55960 (dated Feb. 5, 2016) (correponding PCT application).

* cited by examiner

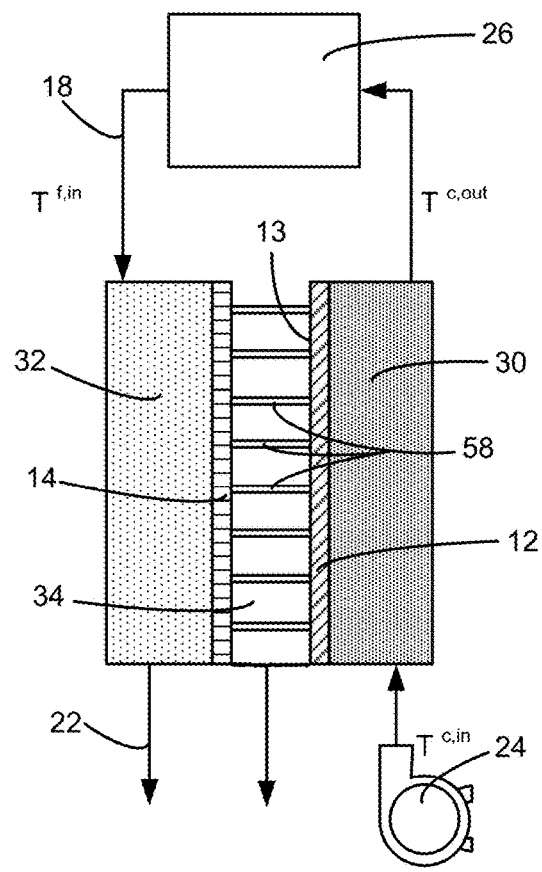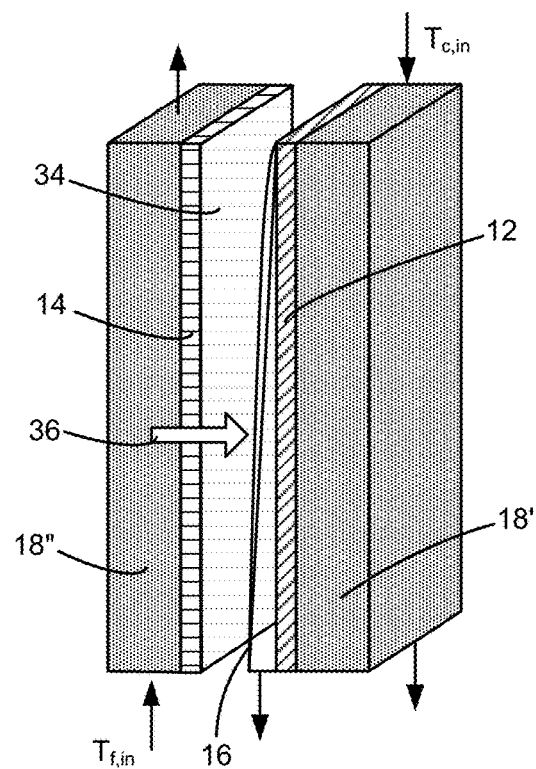
FIG. 1
FIG. 2

HYDROPHOBIC AIR-GAP MEMBRANE DISTILLATION

BACKGROUND

Membrane distillation for desalination involves the passage of hot salt water (as a feed liquid) over a microporous hydrophobic membrane that allows pure water vapor through while retaining the dissolved salts in solution by establishing a temperature-driven vapor pressure difference between the feed and permeate sides of the module. The hydrophobicity of the membrane ensures that liquid water does not pass through the membrane and thereby ensures nearly complete elimination of non-volatile impurities.

Depending on the design of the condensing/permeate system on the other side of the membrane, membrane distillation is categorized into various types, as described below.

In direct contact membrane distillation (DCMD), a cold pure water stream flows on the other side (i.e., the permeate/condensate side) of the membrane from and counter-current to the feed; and the water vapor condenses into the cold pure water stream, transferring heat into the cold pure water stream, when the water vapor leaves the membrane. Because the hot and cold streams are separated only by a thin membrane, there is significant sensible heat transfer. This heat transfer, in addition to being a loss, also adds to temperature polarization in the streams. The heated pure water stream then passes goes through a heat exchanger where energy is transferred into the incoming feed to preheat it, thereby recovering part of the condensation energy.

In the case of air gap membrane distillation (AGMD), there is an air gap across which the vapor diffuses before condensing on a heat-transfer plate maintained at a low temperature by a coolant stream. Consequently, sensible heat loss from the feed is reduced since air has a lower thermal conductivity. The evaporated water has to diffuse through the air gap and reach the film of condensate on the heat-transfer plate, which becomes one of the rate limiting steps. A feed liquid is circulated via a pump and flows through respective chambers on opposite sides of the membrane and heat-transfer plate and is heated by a heater when passing from the first chamber (where the feed liquid serves as a coolant via heat transfer through the heat-transfer plate) to the second chamber, from which the pure water is removed from the heated feed water through the membrane. Pure water product is extracted from the bottom of the air gap, while the brine remaining from the feed liquid is extracted from the bottom of the second chamber. In other embodiments, the pure water product is extracted from the top of the gap forcing the air gap to be flooded with water, forming a liquid gap. The gap usually contains a spacer material, typically made of non-conductive plastic to hold the membrane in place.

Sweeping gas membrane distillation (SGMD) utilizes an air stream that flows on the permeate side picking up the incoming vapor and becoming humidified as the stream moves along the module. Generally, the temperature of air also increases along the module. The hot humid air is then cooled in a condenser where produced pure water is recovered.

Material gap membrane distillation (MGMD) is a recent configuration where sand, which has a low thermal conductivity (i.e., acts as a thermal insulator), is used to fill the gap [see L. Francis, et al., "Material gap membrane distillation: A new design for water vapor flux enhancement," 448 Journal of Membrane Science 240-247 (2013)].

Other configurations include the vacuum membrane distillation (VMD) system, which has been adapted into a multi-stage configuration and is being marketed commercially by Memsys of Singapore and Germany [see Zhao, K., et al. "Experimental study of the memsys vacuum-multi-effect-membrane-distillation (V-MEMD) module." *Desalination* 323 (2013): 150-160].

The difference in performance between these systems is a consequence of different transport resistances on the condensing side.

SUMMARY

A distillation apparatus and methods for distillation using a rough and hydrophobic heat-transfer surface are described herein, where various embodiments of the apparatus and methods may include some or all of the elements, features and steps described below.

An apparatus for high flux energy-efficient air-gap distillation comprises: a feed-liquid source including a feed liquid; a distillation module comprising: (a) a feed-liquid chamber containing feed liquid in fluid communication with the feed-liquid source to establish a flow of the feed liquid through the feed-liquid chamber, wherein the feed-liquid chamber includes a selectively porous material that allows a component of the feed liquid to pass through the selectively porous material and exit the feed-liquid chamber in vapor form but not in liquid form; (b) a condensing surface maintained at a lower temperature than the feed liquid in the feed-liquid chamber, wherein the selectively porous material is between the feed-liquid chamber and the condensing surface, wherein the condensing surface is sufficiently hydrophobic to produce a contact angle with water of at least 150°, and wherein the condensing surface has a rugosity greater than 2; and (c) a gap between the selectively porous material and the condensing surface.

Another apparatus for high flux, energy-efficient air-gap distillation comprises: a feed-liquid source including a feed liquid; a distillation module comprising: (a) a first feed-liquid chamber in fluid communication with the feed-liquid source, the first feed-liquid chamber including a heat-transfer plate with a condensing surface, wherein the condensing surface is sufficiently hydrophobic to produce a contact angle with water of at least 150°, and wherein the heat-transfer surface has a rugosity greater than 2; (b) a conduit coupled with the first feed-liquid chamber to extract the feed liquid after the feed liquid flows through the first feed-liquid chamber; (c) a heat source configured to heat the feed liquid in the conduit; (d) a second feed-liquid chamber coupled with the conduit and configured to receive the feed liquid after the feed liquid flows through the conduit and is heated by the heat source, wherein the second feed-liquid chamber includes a selectively porous material that allows a component of the feed liquid to pass through the selectively porous material and exit the second feed-liquid chamber in vapor form but not in liquid form, wherein one side of the selectively porous material faces the condensing surface of the heat-transfer plate; and (e) a gap between the condensing surface and the selectively porous material; and a condensate collection receptacle in fluid communication with the gap.

The feed liquid can comprise a volatile component and a less-volatile component from which the volatile component is separated via vaporization through the selectively porous material. In particular embodiments, the feed liquid comprises water. The feed liquid can further comprise at least one of the following: water including dissolved salt, water including suspended solute, water including suspended oil, water-alcohol mixture, and fruit juice.

The selectively porous material can have a contact angle with the feed liquid of greater than 90° and allows vapor phase to pass through while preventing liquid feed from passing through. In particular embodiments, the selectively porous material can comprise at least one of the following: a polymer membrane, a porous ceramic material, and a porous graphene material. The polymer membrane can comprise at least one of the following: polyvinylidene difluoride, polytetrafluoroethylene, and polypropylene.

The condensing surface can comprises copper oxide. The copper oxide can be coated with a silane, and the silane can be fluorinated. In additional embodiments, the condensing surface can comprise a composition selected from at least one of the following: acrylics, amides, carbonates, dienes, esters, ethers, fluorocarbons, olefins, styrenes, vinyl acetals, vinyl esters, vinyl keytones, and vinylpuridine polymers. The condensing surface can be sufficiently hydrophobic to produce a contact angle with water of greater than 165°.

The gap can have a thickness, extending from the membrane to the condensing surface of less than 5 mm.

A method for energy-efficient air gap distillation comprises: flowing a feed liquid through a first feed-liquid chamber of a distillation module, wherein the first feed-liquid chamber includes a condensing surface that is sufficiently hydrophobic to produce a contact angle of at least 150° with water and that has a rugosity greater than 2; heating the feed liquid; flowing the heated feed liquid through a second feed-liquid chamber of the distillation module, wherein the second feed-liquid chamber includes a selectively porous material that includes an outer surface in fluid communication with a gap between the selectively porous material and the first feed-liquid chamber; permeating a vapor component from the feed liquid in the second feed-liquid chamber through the selectively porous material into a gap between the selectively porous material and the condensing surface; condensing the vapor component of the feed liquid as a jumping droplet from the condensing surface in the gap to produce a liquid condensate in the gap; removing the liquid condensate from the liquid-gap chamber; and removing from the second feed-liquid chamber a brine remaining from the feed liquid after the vapor component permeates through the selectively porous material.

The vapor component can pass through micropores in the selectively porous material, while the flow of liquid-phase components from feed liquid through the micropores is prevented.

The feed liquid entering the second feed-liquid chamber can be at a temperature in a range from 40° C. to 100° C. The feed-liquid temperature can be raised to the range of 40° C. to 100° C. via heating provided by a solar heat collector. The feed liquid entering the second feed-liquid chamber can also be pressurized as its temperature is increased to a range from 100° C. and 140° C.

An additional method of high-effectiveness heat transfer between two fluids while also producing additional pure water from the hot stream comprises: flowing a cool fluid through a coolant-flow chamber of a distillation module; flowing a hot feed liquid through a hot-feed-liquid chamber of the distillation module, wherein the hot fluid has a higher temperature than the cool fluid, and wherein the feed-liquid chamber includes a selectively porous material that includes an outer surface in fluid communication with a gap between the selectively porous material and the coolant-flow chamber; permeating a vapor component from the hot feed liquid in the hot-feed-liquid chamber through the selectively porous material into a gap; condensing the vapor component of the hot feed liquid as jumping droplets at a condensing surface to form a liquid condensate in the gap; removing the liquid condensate from the gap; and removing, from the hot-feed-liquid chamber, a cooler brine remaining from the hot feed liquid after the vapor component permeates through the selectively porous material; and removing the cool fluid as a warmer stream from the coolant-flow chamber after energy is transferred into the cool fluid from the gap.

The apparatus and methods can be advantageously compared to large-scale multi-stage flash distillation (MSF) and multiple-effect distillation (MED) plants since the amount of metal required in its construction can be smaller. The large systems also have several additional components to create and maintain low pressures, whereas no vacuum is needed in this system. The construction cost in a single-stage apparatus of this disclosure can also be much less than, e.g., Memsys' multi-stage vacuum membrane distillation systems since no vacuum pumps or pressure chambers are required in the apparatus and methods described herein.

The apparatus and methods can be used to separate/purify a fluid (e.g., water) and/or to concentrate waste products in a brine solution, e.g., when treating waste water, such as flowback or produced water from oil or gas production, to reduce environmental contamination and to reduce the costs of waste disposal.

BRIEF DESCRIPTION OF THE DRAWINGS

FIG. 1 is a diagram of an AGMD apparatus.

FIG. 2 is a perspective view showing the AGMD apparatus.

FIG. 3 shows a condensate film; FIG. 4 shows jumping droplets; FIG. 5 shows drop-wise falling droplets; and FIG. 6 shows a flooded air gap.

Figure 3:
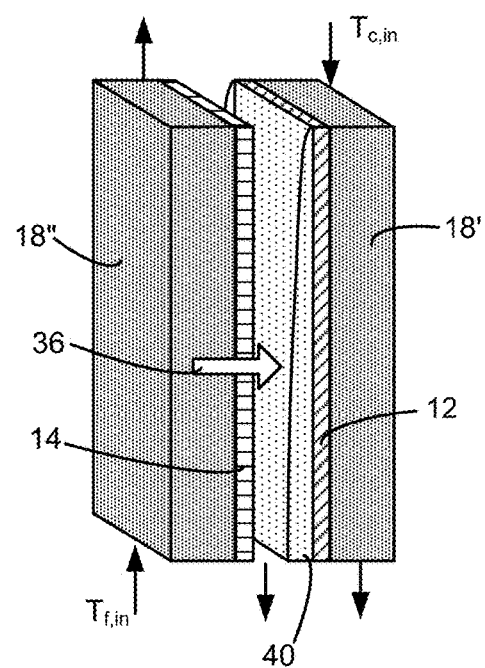
FIGS. 3-6 are diagrams showing condensation regimes that may occur in AGMD.

In the accompanying drawings, like reference characters refer to the same or similar parts throughout the different views; and apostrophes are used to differentiate multiple instances of the same or similar items sharing the same reference numeral. The drawings are not necessarily to scale; instead, emphasis is placed upon illustrating particular principles in the exemplifications discussed below.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2%) can be understood as being within the scope of the description; likewise, if a particular shape is referenced, the shape is intended to include imperfect variations from ideal shapes, e.g., due to manufacturing tolerances. Percentages or concentrations expressed herein can represent either by weight or by volume. Processes, procedures and phenomena described below can occur at ambient pressure (e.g., about 50-120 kPa—for example, about 90-110 kPa) and temperature (e.g., −20 to 50° C.—for example, about 10-35° C.) unless otherwise specified.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Additionally, the various components identified herein can be provided in an assembled and finished form; or some or all of the components can be packaged together and marketed as a kit with instructions (e.g., in written, video or audio form) for assembly and/or modification by a customer to produce a finished product.

In distillation apparatus and methods, described below, a membrane or another type of selectively porous material (which may, for convenience, collectively be referred to as "membranes" herein) is used to separate the more volatile component of a mixture through phase change. Areas of application for the apparatus and methods include desalination, food processing, waste treatment, and high purity water production for industrial applications. Due to its ability to use low feed-liquid temperatures, membrane distillation is well suited for harnessing solar and geothermal energy sources and has seen much growth in off-grid remote desalination applications. The overall market, on the other hand, is dominated by other large scale multi-stage flash (MSF) or multi-effect distillation (MED) systems that produce millions of gallons of water per day and consume lesser energy per unit of desalinated water produced [characterized by a gained output ratio (GOR) in excess of ~8]. The invention shows promise for similar efficiencies with lower capital investments.

Embodiments of the apparatus and methods include the application of superhydrophobic condensing surfaces 13 in a variety of configurations for the Air Gap Membrane Distillation (AGMD) technology. This approach constitutes drop-wise and jumping-droplet AGMD, and includes the novel of ideal of hydrophobic and superhydrophobic AGMD systems. This approach also has the potential to significantly improve AGMD condensate flux and efficiency.

Uses for AGMD, including the approaches described herein, include desalination, food processing, and high quality chemical processing. Interest and research in AGMD is perhaps the most rapidly growing in the desalination industry. The approach disclosed here can provide for a significant improvement in the condensate production and thermal performance of AGMD. In desalination, membrane distillation uniquely scales down very well to small sizes, enabling its current budding market niche with solar thermal heat. Recent papers have shown that membrane distillation can theoretically reach gained output ratio (GOR) efficiencies superior to all other thermal desalination technologies. As efficiency is critical in enabling widespread adoption of the technology (because energy drives costs), the efficiency improvements offered by the approach presented here is particularly advantageous.

The approach described herein employs hydrophobic condensing in AGMD and is enabled for the variety of AGMD configurations. In typical AGMD, a hot saline feed side passes a hydrophobic membrane 14, which allows hot water vapor 36 to pass there through but not the saline liquid water solution. The vapor 36 crosses an air gap 34 and is condensed on a condensing surface 13. The condensing surface 13 may be cooled by a cold stream, or in multistage configurations, by feed streams at progressively lower temperatures.

The gap 34 can be in fluid communication with a vacuum pump or a water column (to produce a pressure head) to reduce the pressure in the gap below the ambient pressure (i.e., below the pressure in the atmosphere surrounding the apparatus). See E. Summers, "Development of Energy Efficient Membrane Distillation Systems," Massachusetts Institute of Technology, PhD. Thesis, 67-69 (2013) for further discussion of reduced-pressure gap AGMD.

The apparatus and methods were tested via AGMD experiments with fully characterized heat and mass transfer conditions; and the experiments were performed with combinations of untreated, hydrophobic, and superhydrophobic condensation surfaces paired with untreated and superhydrophobic air gap support meshes of both high and low conductivities to determine optimum conditions for energy-efficient permeate production in AGMD. Copper-oxide-coated copper-plate condensing surfaces 13 provided durable 172°±3° contact angles and jumping-droplet 42 condensation conditions. The results indicate that the introduction of superhydrophobic surfaces can result in substantial improvements in permeate production, in excess of an additional 110%. During rapid condensation at high temperatures, condensation on the superhydrophobic plate switches from a Cassie-Baxter droplet morphology to flooded conditions 46. In one experiment a mildly hydrophobic surface proved to be superior to both traditional and superhydrophobic surfaces for the wetting flow rates. Additionally, highly conductive spacer meshes led to substantial improvements in permeate production rates, especially when paired with superhydrophobic condensing surfaces 13. The results outline advantageous superhydrophobic condensation conditions at varied feed and cold side temperatures for substantial improvement for AGMD systems.

Contact Angle:

As used herein, contact angle in regards to condensation is the angle at which the liquid vapor interface touches the solid surface. A contact angle of 90 degrees indicates a surface that is neither hydrophobic nor hydrophilic. A droplet on such a surface would look like a half sphere. On hydrophobic surfaces, which have contact angles greater than 90°, the droplet more and more resembles a full sphere. The shape of a full sphere is approached as the contact angle approaches 180°.

Jumping Droplet Condensation:

Jumping droplet condensation, which can occur at the condensing surface, is a special kind of droplet condensation that can occur on superhydrophobic surfaces. When droplets combine to form a larger droplet, the total surface area decreases. In liquids there is energy associated with the surface tension times the surface area; this energy is released into a wobbling or other motion when surface area decreases. On superhydrophobic surfaces, the attraction of the droplet to the surface is sufficiently weak that wobbling of the droplet after droplets combine is sufficient to propel the droplet to break off of the surface. Such droplets typically have a diameter between 10 to 100 µm. These droplets cause a significant increase in heat and mass transfer coefficients, enabling more efficient condensation.

A spacer 58 can be included in the gap 34 and can be in the form of a woven fabric or mesh or other porous structure that allows vapor to pass through. Yet the spacer 58 can be hydrophilic and can be in contact with the condensing surface 13 to wick water away from the condensing surface 13.

An AGMD apparatus is shown in FIG. 1, wherein feed fluid 18" and coolant 18', which can be the feed fluid before passing through the heater 26 that heats the feed fluid, flow in opposite directions, in essentially a counter current exchange, with a membrane 14 and air gap between them and with spacers 58 stretching across the air gap. A heat source 26 is applied before the feed inlet, and pumping is utilized. The heat may be heat from an electric power plant, waste heat, solar thermal, geothermal, or other heat sources. Multistage membrane distillation, consisting of multiple membrane-distillation modules in more sophisticated configurations, benefits from the hydrophobic AGMD design, as well.

The method is further illustrated in FIG. 2, where a feed liquid 18 [e.g., salt water (with salt content of, e.g., 0.5 to 40% by weight), water with suspended solute(s) or oil(s), an alcohol-water mixture, fruit juice(s)] is circulated via a pump 24 through a first feed-liquid chamber 30 bounded by a heat-transfer plate 12. The feed liquid 18 then passes through a heater 26 that raises its temperature, e.g., to 40-100° C. This degree of heating can be provided by a heater 26 in the form of a solar collector. Alternatively, the feed liquid 18 can be pressurized and its temperature can be raised to 100-140° C. by the heater before entering the second feed-liquid chamber 32. The heated feed liquid 18" then flows through the second feed-liquid chamber 32, where a vapor phase 36 (i.e., a component of the feed liquid with higher volatility than other components in the feed liquid) passes from the second chamber 32 through micropores (e.g., pores with diameters of 0.1 to 0.6 µm) in the selectively porous material 14 into the gap 34 where the vapor 36 recondenses (e.g., as pure water 16) as it cools. Cooling is provided by heat transfer across the heat-transfer plate 12 to the cooler liquid 18' in the first feed-liquid chamber 30. At the bottom of the second feed-liquid chamber 32, a concentrated brine 22 is removed, while the extracted fluid 20 (in liquid form) is removed from the top or bottom of the liquid-gap chamber 34. In other embodiments, a separate coolant fluid can pass through the first feed-liquid chamber 30 instead of the unheated feed liquid 18 to provide cooling.

The selectively porous material 14 through which the vapor 36 passes is hydrophobic (i.e., has a contact angle of greater than 90° with the feed liquid 18); it allows vapors to pass through but not water or other liquid-phase components. In particular embodiments, the selectively porous material 14 is a polymer membrane formed, e.g., of polyvinylidene difluoride (PVDF), polytetrafluoroethylene (PTFE), or polypropylene (PP). In other embodiments, the selectively porous material 14 is formed of a porous ceramic material or of porous graphene.

Figure 4:
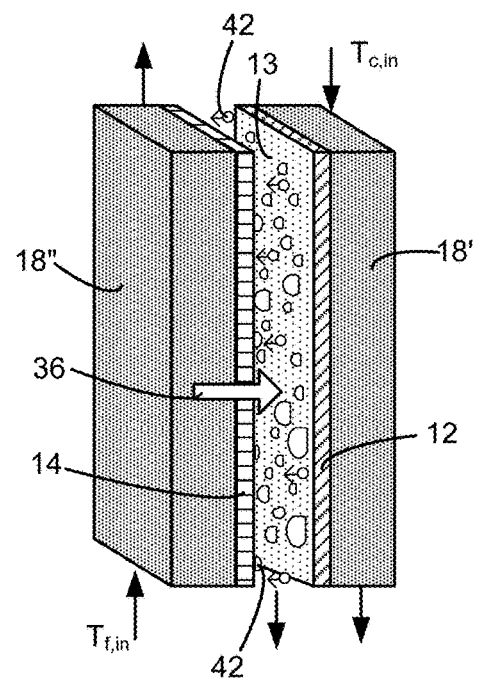
Figure 5:
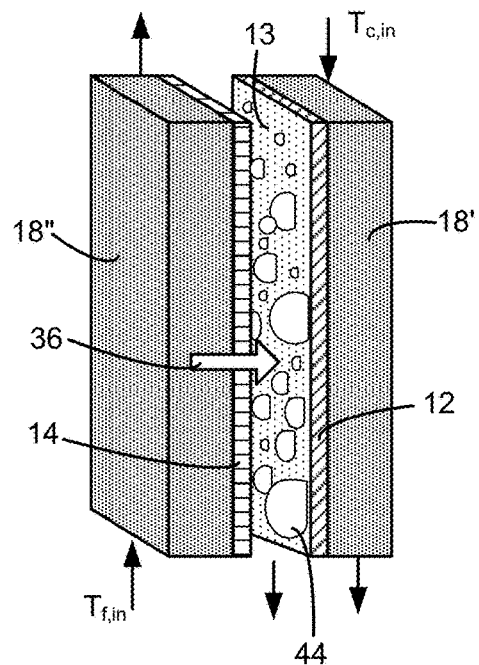
Figure 6:
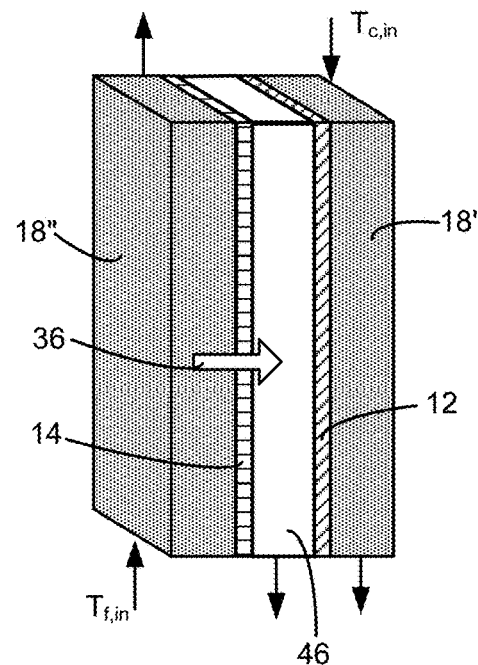

Different condensation regimes that may occur in AGMD at the condensing surface 13 are shown in FIGS. 3-6. FIG. 3 shows a condensate film 40; FIG. 4 shows jumping droplets 42; FIG. 5 shows drop-wise falling droplets 44; and FIG. 6 shows a flooded air gap 46.

Different embodiments of the invention use different methods to generate hydrophobicity on the condensing surface 13 of the heat-transfer plate 12. Many of the methods rely on a combination of surface roughness and a coating that repels liquid water. However, surfaces can achieve reasonable hydrophobicity with only one of these features. Superhydrophobic coatings that can serve as the condensing surface 13 are typically electronegative, which repels the hydrogen atoms in liquid water. Thus these coatings can contain fluorine, though other compositions can be used, as well. The coatings can be created in multiple steps, often doing the roughness and coating steps separately. Submersion in a liquid and using crystal growth or a chemical reaction can be used to create the surface roughness. Various types of etching or other processes that remove parts of an existing surface can also be used to create surface roughness. The etching can be done with a plasma, a laser, or other methods. These surfaces can employ a nanostructure, a microstructure, or a hierarchical structure to achieve high roughness. Sol-gel techniques can also be used. The most common method of applying a surface coating is vapor deposition, as it allows for the very thin layers to be applied evenly. The surfaces can also be made rough by being made of polymers or fabrics.

In particular embodiments, the condensing surface 13 includes hydrophobic molecules and has high surface roughness. The condensing surface 13 can have, for example, a roughness factor (rugosity), which is the total surface area over the projected (two-dimensional) area of the surface, of greater than 2. In particular embodiments, the rugosity of the condensing surface is greater than 5 and can be as high as about 10. The solid fraction of the condensing surface 13 can be, e.g., about 2 to 3% with the remainder being void space. Hydrophobic molecules can be applied by surface coating, by using a hydrophobic material as a condensing surface 13. Common hydrophobic materials are typically nonpolar, and include acrylics, amides, carbonates, dienes, esters, ethers, fluorocarbons, olefins, styrenes, vinyl acetals, vinyl esters, vinyl keytones, and vinylpuridine polymers.

Many methods can be used to increase surface roughness for hydrophobicity, including particle deposition methods, such as spraying and crystallization, and chemical reactions with the surface, such as oxidation.

The following contents detail the experiments and modeling of an embodiment of the invention.

Introduction:

Membrane distillation (MD) is an up-and-coming thermal desalination technology with a unique niche in providing small-scale low-maintenance desalination. Recent work has suggested membrane distillation can have superior efficiencies to all other thermal desalination technologies, as well. Air-gap membrane distillation (AGMD) utilizes a membrane distillation configuration with an air-filled cavity between the membrane 14 and condensing surface 13, traditionally with laminar film condensation 40. The thermal resistance of the air gap prevents conduction between the cooling surface and the hot feed, making AGMD the most efficient mainstream membrane-distillation technology, at the cost of a large associated mass transfer resistance from diffusion through the air gap [see R. N. Wenzel, "Resistance of solid surfaces to wetting by water," 28 *Industrial & Engineering Chemistry* 988-994 (1936)]. Accordingly, a trade-off exists between system size and efficiency for AGMD, which has required large condensing areas to be superior.

Research work in condensing surfaces has focused on drop-wise condensing on hydrophobic surfaces, which can have 5-7 times the heat transfer coefficient of laminar film condensing [see A. F. Mills, *Heat Transfer, 2nd Edition*. Prentice Hall (1998)]. Jumping-droplet condensation on superhydrophobic surfaces provides further heat transfer coefficient improvement; for an exemplification of the coatings used in this study, previous work has shown a "25% higher heat flux" and "30% higher condensation heat transfer coefficient" compared to "state-of-the-art" hydrophobic surfaces [see N. Miljkovic, et al "Effect of droplet morphology on growth, dynamics and heat transfer during condensation on superhydrophobic nanostructured surfaces," ASC Nano, 1776-1785 (2012)]. The jumping-droplet phenomenon occurs from the combining of small droplets (10-100 µm), as the decrease in surface area releases energy into a wobbling motion that ejects the droplet from the surface id.). The silanated copper oxide (CuO) surfaces used in this study are among the first to solidly tackle the challenges of durability, conduction resistance, scalability, and cost that have previously prevented drop-wise condensing systems from entering widespread use in industry. Copper oxide is highly electrically conductive, which is advantageous in this context. Jumping droplet can be achieved where the contact angle of the condensing liquid on the condensing surface 13 is at least about 150° and can be particularly strong, where the contact angle is greater than 165°.

In drop-wise condensation on rough surfaces, two basic types of droplets occur. The first type of droplets is wetted or Wenzel droplets, which are highly adhered and grow quickly. These droplets are highly pinned [see John H. Lienhard, V, and John H. Lienhard, IV, *A Heat Transfer Textbook Fourth Edition*. Dover Publications, Inc. (2011)] and often grow to large sizes before shedding from gravity. The rough surface beneath Wenzel droplets is wetted, which provides for good conduction [see A. B. D. Cassie, et al., "Wettability of porous surfaces," 40 *Transactions of the Faraday Society* 546-551 (1944)]. The other type of droplets is suspended, or Cassie-Baxter droplets, which shed more readily but grow more slowly, as the surface features beneath these droplets are not wetted [see E. Summers, et al., Energy efficiency comparison of single-stage membrane distillation (MD) desalination cycles in different configurations," 290 *Desalination* 54-66 (March 2012), and R. Enright, et al., "Condensation on superhydrophobic surfaces: The role of local energy barriers and structural length scales," 40 *Langmuir* 14424-14432 (2012)]. However, other regimes can be observed, such as partial wetting; the wetting regime depends on the surface geometry, nucleation density, and local energy barriers [see R. Enright, "Condensation on superhydrophobic copper oxide nanostructures. *Journal of Heat Transfer*, 135 (2013)]. Studies have shown that higher contact angles cause smaller droplets sizes that more easily shed from the surface, which enhances heat transfer [A. Lafume, et al., 'Superhydrophobic states," 2 *Nature Materials* (2003)]. Where the contact angle is greater than 90°, drop-wise condensation (rather than laminar condensation, which occurs at smaller contact angles) may be achieved.

The combination of superhydrophobic surfaces and membrane distillation, which is believed to be a novel idea to this work, may provide for significantly increased efficiency and condensate production rate for membrane-distillation desalination.

While heat exchangers have used condensing droplet condensation in the past, the thermodynamics and design of superhydrophobic AGMD are very different, largely due to the combination of tiny confined spaces smaller than the capillary length of droplets, the presence of a porous hydrophobic membrane 14, and the combined heat and mass transfer of water through the porous membrane 14.

Additionally, the system design includes additional parts not seen in hydrophobic condensing for power plants (saline feed, heat exchangers, etc.) as well as a different purpose and thus different design objectives (producing pure water 16, not minimizing temperature differences (delta T's) in heat transfer for power production).

Condensing in AGMD:

Several condensing regimes may occur in AGMD, depending on the condensation rate, air gap width, module height, surface hydrophobicity, and other parameters. Traditional AGMD simply condenses in the laminar film 40 regime and is well understood. With superhydrophobic surfaces, jumping droplets 42 may occur, especially at low permeate flow rates and short module heights. In this regime, small droplets combine and eject from the surface. As AGMD surfaces are typically vertical, they will travel across the gap and hit the membrane 14, where they either will adhere and fall down or will bounce off. As the superhydrophobic surface is much more hydrophobic than the mildly hydrophobic membrane 14, and because the surface of the membrane 14 is relatively smooth, the jumping droplets 42 tend to flow down that membrane surface.

Hydrophobic AGMD Module Types:

AGMD modules consist of the membrane area and the related feed, condensing, and cooling channels. Essentially, the AGMD module is where desalination physically occurs in an AGMD system, and thus excludes other piping, pumps, tanks, etc. The most common system is a flat plate module, where the 2-D system described here continues for a long flat width. The module is usually thin enough such that edge effects are negligible and such that 1-D system modeling is sufficient. In experimental and industrial applications, these systems are typically assembled as a series of flat plates screwed or clamped together. The various channels (cooling, heating, condensate) are typically created by depth variations in the plates. Computer numerical control (CNC) machining, laser cutting, molding, and 3D printing are all effective ways to produce such plates, though CNC machining is often more cost effective. Bolts or clamps are used to keep the plates together.

An alternative method of AGMD module design is spiral-wound modules and tube modules. Essentially, the spiral-wound modules can be visualized as curved flat plate modules with larger diameters relative to the air gap thickness, and they can be modeled as flat-plate membrane-distillation modules. Spiral-wound modules are often more compact and can be manufactured at scale effectively. If tilted significantly from vertical, however, spiral-wound modules may deviate from air gap behavior. A spiral-wound module can be visualized as the result of winding a very wide flat-plate module around a pole. A tube module is created via concentric cylinders, which alternate with feed, and gap/condensate channels. AGMD Superhydrophobic condensing occurs similarly in flat plate, spiral wound, and tube modules.

Another type of AGMD system is a hollow-fiber module. Hollow-fiber modules differ significantly as fluid travels through tiny capillary tubes, rather than flat modules. Two configurations exist, with feed inside or outside the fibers. With feed inside the fibers, the outer tubes can be coated, allowing for very effective condensation with high heat transfer coefficients on the exterior, although more fouling issues may occur inside the fibers. With the feed on the outside, hollow fiber interiors can be made superhydrophobic via processes that circulate a coating material through them, or by choosing hydrophobic materials for the capillaries themselves.

The regime that occurs is largely a function of the supersaturation of vapor 36, which is roughly equivalent to the temperature difference, and the heat flux, which is roughly equivalent to the condensate flux, as most heat is transferred by the latent heat of fusion. In AGMD, the temperature difference is a system parameter that is effected by temperature polarization; and the heat flux is a function of diffusion and thus of the air gap size and other parameters. Varied combinations of air gap size, hydrophobicity, and temperatures were performed to gain a comprehensive view of superhydrophobic conditions in membrane distillation.

Hydrophobicity:

An important design parameter for hydrophobic AGMD is the surface hydrophobicity of the condensing surface 13. The simplest measurement for hydrophobicity is the contact angle, which describes how sharply a droplet contacts the surface. In embodiments of the apparatus, moderately hydrophobic surfaces (contact angle<90) caused dropwise condensation; and sufficiently increased hydrophobicity causes jumping-droplet condensation 42. For higher heat transfer coefficients, higher hydrophobicity is advantageous.

Air Gap Spacing:

An additional parameter that can be optimized is the air gap spacing for AGMD. The gap offers the advantage of creating a heat transfer resistance, which decreases entropy generation and losses, but also decreases permeate flux. A larger gap increases both resistances. Air gaps that are too small will also experience flooding or thermal bridging 46, where the gap fills with liquid. Therefore, gap size optimization is advantageous, and can be done with the modeling described in this patent. To reduce flooding, the air gap length before condensing can be optimized, and can be made shorter to reduce flooding.

Spacer Structures for Improving Heat Transfer:

Several novel unique structures can enhance AGMD and hydrophobic AGMD. Fins, mesh, metal foam, metal fiber, and similar structures may be used in the air gap to increase the heat transfer area. These structures are positioned for good thermal contact with the heat-transfer plate 12 and can be created by machining into the heat-transfer plate 12. Alternative conducting materials besides metal may be used, such as certain polymers and ceramics. These structures are designed not to trap water, which may prevent draining; hydrophobic coatings on AGMD structures can accomplish these results.

Spacer Structures for Improved System Draining:

Excess droplets in hydrophobic AGMD condensing and excess film thickness in traditional AGMD can cause thermodynamic losses because of conduction from hot to cold side and temperature gradients that are not used to produce vapor 36. Designing grooves into the AGMD plate surface that act as drains may allow for more efficient removal of condensate, and thus thinner and more efficient AGMD air gaps. These channels may have reduced hydrophobicity to encourage wicking behavior. One embodiment of this channels is simple diagonal grooves on a vertical AGMD plate module, where the grooves run deep, with a depth similar to the width of the air gap, itself.

Figure 7:
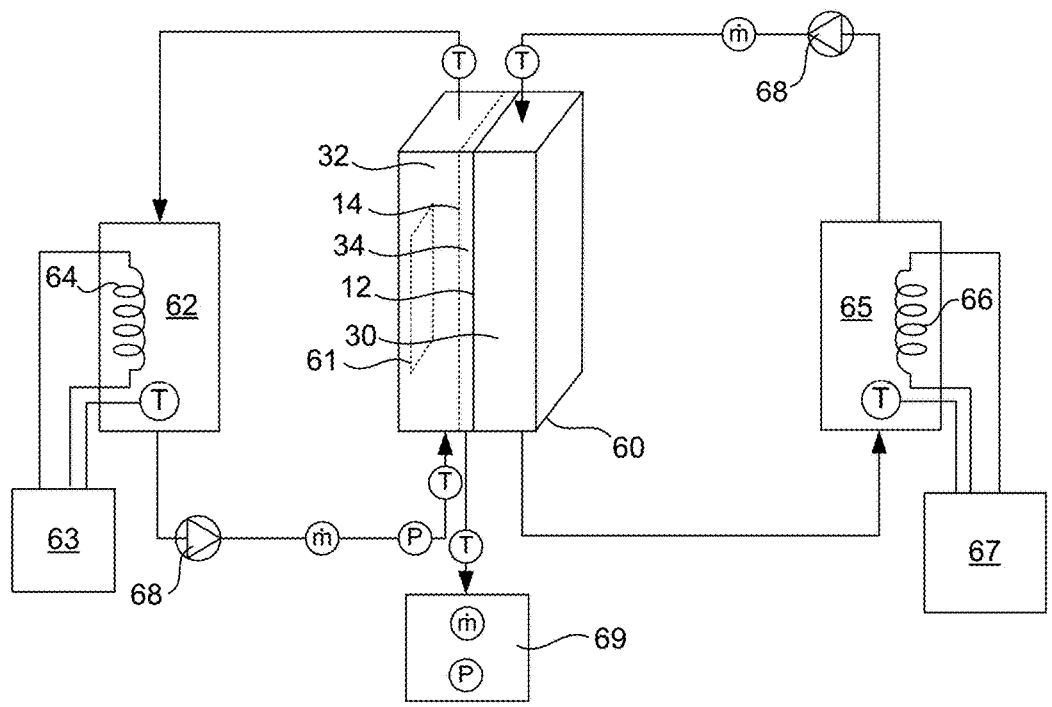
FIG. 7 is a schematic illustration of an experimental system including a central AGMD module; paired heating and cooling loops; a condensate collection tank; and various temperature, pressure and flow-rate sensors.

Experiment Design:

An air-gap membrane distillation apparatus, as is schematically illustrated in FIG. 7, was constructed with highly controlled operating conditions and designed for pairing with Engineering Equation Solver (EES) Modeling. The following features/components are illustrated in FIG. 7: an AGMD module 60; a flow visualization 61; a feed-liquid loop including a hot reservoir 62 heated by a heating controller 63 and a resistive heater 64 controlled by the controller 63; and a coolant loop including a cold reservoir 65 cooled by a chilled fluid (e.g., water) conduit 66, the flow through which is controlled by a cooling controller 67. The fluids are circulated through the loops via pumps 68, and concentrated condensate from the feed liquid is discharged into and collected in a condensate tank 69. Shown through the system are temperature sensors (T), pressure sensors (P), and flow-rate sensors (ṁ). The system has small delta T's (<0.5° C.) across the air gap to focus on finely controlling conditions within the AGMD module. It was designed for parametric studies of AGMD operating parameters, rather than overall efficiency.

The apparatus includes a central AGMD module, paired heating and cooling loops, a condensate collection tank, and various temperature, pressure, and flow rate sensors. The tanks were sized to maintain stable temperatures; and the pipes, pumps, collection tank, and component temperature tolerance were designed to withstand a wide range of operating conditions.

Figure 8:
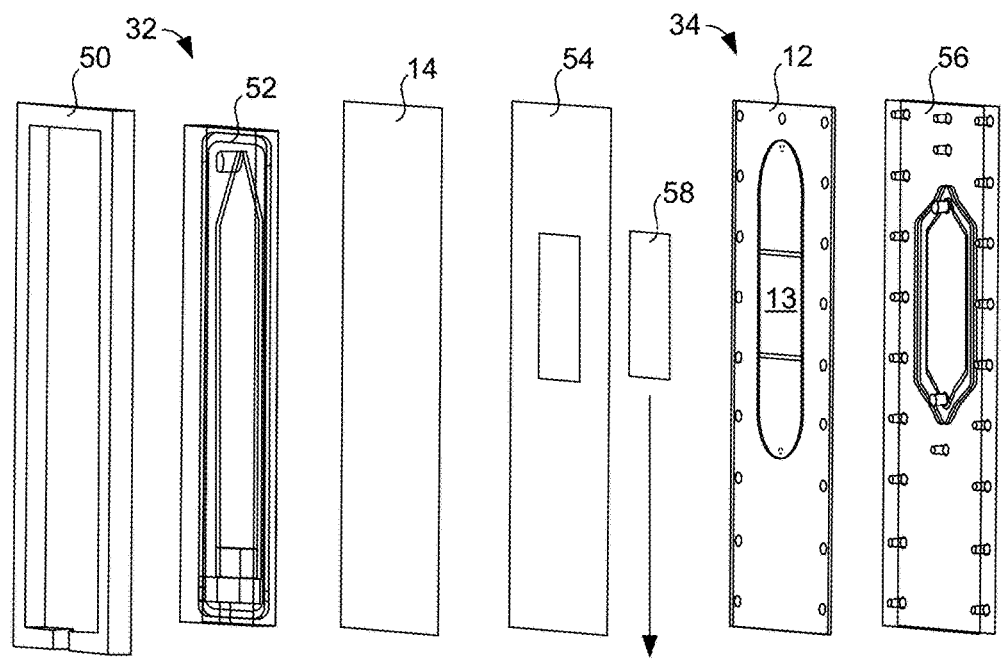
FIG. 8 is an exploded view of a membrane-distillation module.
Figure 9:
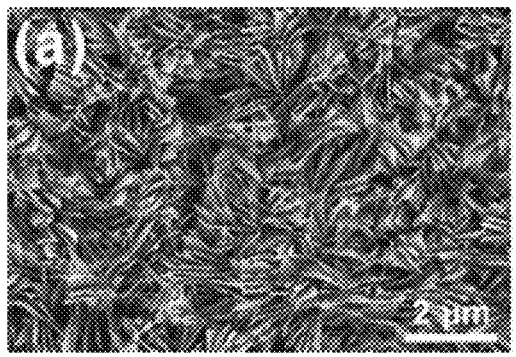
FIGS. 9-12 provide field emission scanning electron microscope (FESEM) showing copper oxide nanostructure surfaces from a top view (FIG. 9), a side view (FIG. 10), close up on the oxide "blades" without the silane coating (FIG. 11), and the blades after they have been silanized (FIG. 12).
Figure 10:
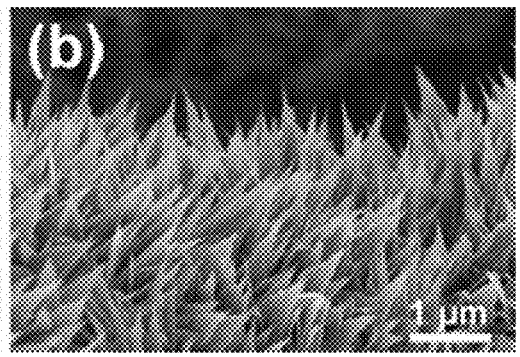
Figure 11:
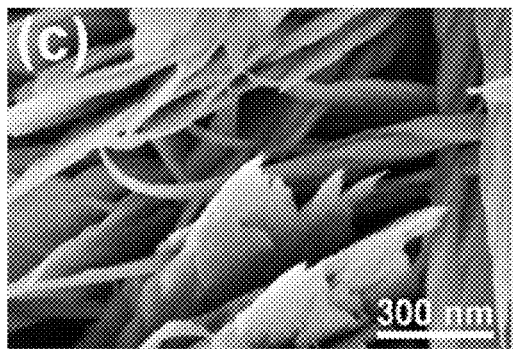

The air-gap module, itself, was constructed with a series of machined plates, designed in Solidworks and created with CNC machining. As shown in the exploded view of FIG. 8, the layers/plates include a metal flange 50, a feed piece 52 for containing the flow of feed liquid 18'' in the second chamber 32 clamped down from the flange 50, a membrane 14, a spacer 54 that controls the active membrane area, a mesh spacer 58, a metal heat-transfer plate 12, and a cold-side flow loop 56 for containing the flow of cooling liquid 18''' through the first chamber 30. The feed and cooling channels are machined into clear polycarbonate blocks. In this embodiment, an aluminum plate acts as heat-transfer plate 12 providing a condensing surface 13; and the small support mesh spacer 58 holds up the membrane 14 in the air gap.

| Variables | Symbol | Typ Value | Control |
|---|---|---|---|
| Feed Temp | $T_{f,\,in}$ | 30-80° C. | ±0.1° C. |
| Feed flow rate | $m_{f,\,in}$ | 0.03-0.3 kg/s | ±0.003 kg/s |
| Coolant Temp | $T_c$ | 10-50° C. | ±0.5° |
| Coolant flow rate | $m_{c,\,in}$ | 0.2 kg/s | ±0.003 kg/s |

In this embodiment, the air gap 34 has a thickness of 1-2 mm, and the pressure in the system is 1 atm. The feed channel (turbulent fully developed) in the second chamber 32 has a length of 16 cm, a width of 12 cm, and a height of 4 mm. Measurement in the system is performed with thermistors (having an uncertainty of ±0.1° C.) and a scale for condensate (having an uncertainty of ±0.1 g).

Figure 12:
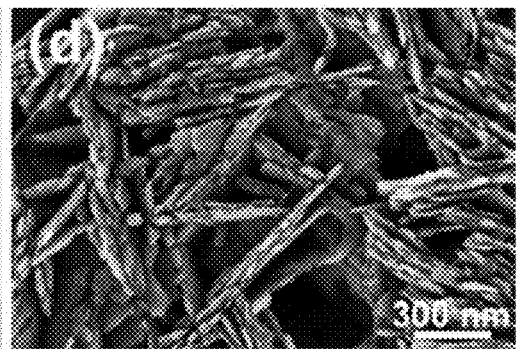

Superhydrophobic Coating:

The superhydrophobic condensing surface 13 used for this experiment was a silanized copper oxide (CuO) nanoscaled surface, shown in the magnified images of FIGS. 9-12, that was found to have a 25% higher heat flux and 30% higher condensation heat transfer coefficient than conventional copper at low supersaturations. The images of FIGS. 9-12 were taken with a field emission scanning electron microscope (FESEM) and show the copper oxide nanostructure surface from the top view (FIG. 9), side view (FIG. 10), and close up on the oxide "blades" without the silane coating (FIG. 11), as well as the blades after they have been silanized (FIG. 12). As shown by FIGS. 9-12, the surface covered in copper nanoscale oxide blades allows for selective nucleation of partial wetting (PW) droplets and high nucleation densities.

The process used to create the superhydrophobic surface is low-temperature and self-limiting. A polished, copper alloy plate (Alloy 110, 99.9% pure) was cleaned in an ultrasonic bath in acetone for 10 minutes and rinsed with deionized water, ethanol, and isopropyl alcohol. The plate was dipped in a 2.0 M HCl bath for 20 minutes to remove the surface oxide layer before being rinsed with deionized water. The plate was then dried with pure nitrogen gas.

The plate was immersed in a 96±3° C. solution of $NaClO_2$, $NaOH$, $Na_3PO_4 \cdot 12H_2O$, and deionized water (3.75:5:10:100 wt %) in order to create the copper oxide nanostructure. This process creates a thin layer of copper (I) oxide, $Cu_2O$ that then reoxidizes into the sharp copper CuO (II) oxide nanostructure.

Flourinated silane [trichloro(1H,1H,2H.2H-perflourooctyl)-silane from Sigma Aldrich], with the molecular formula, shown below, was then deposited from the vapor phase onto the CuO nanostructured surface to give the plate its hydrophobic character without changing the surface morphology.

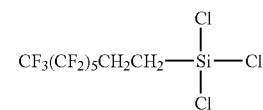

The deposited layer had a nanostructure surface height (measured from peak to valley), h≈1 μm, a solid fraction, φ≈0.023, and a roughness factor [rugosity or (total surface area)/(projected area), r≈10.

Figure 13:
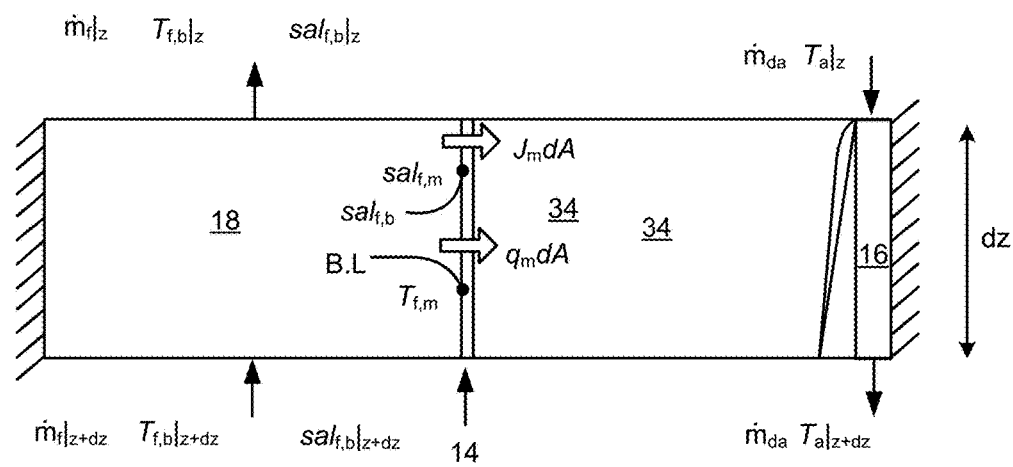
FIG. 13 is a sectional illustration of a unit cell for AGMD.
Figure 14:
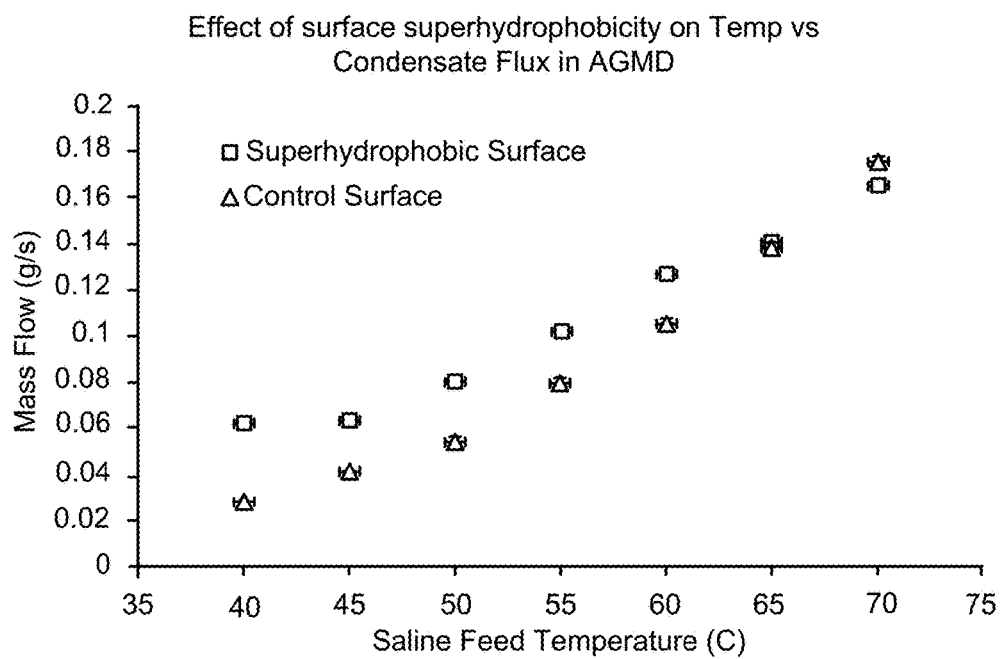
FIG. 14 is a plot showing the effect of surface superhydrophobicity on temperature versus condensate flux from an AGMD superhydrophobity experiment with a 0.7 mm air gap and a 13° C. cold side temperature.

Modeling:

The experimental system was fully characterized by numerical modeling with Engineering Equation Solver (EES) from F-Chart Software. (Madison, Wis., USA). As shown in FIG. 13, a 1-D model of AGMD was used. The model calculates the transport of mass and energy across a unit cell, with about 400 unit cells used to describe the experimental system. The model includes flow parameters, such as Reynolds number and calculates a variety of parameters, including Nusselt numbers, Sherwood number, Schmidt number, effective conductivities, condensation film 40 thickness, diffusion, thermal resistances, and membrane-distillation membrane flux. The modeling includes concentration and temperature polarization effects in the feed channel near the membrane surface, as shown in the diagram with salinity and temperature gradients near the membrane surface.

The model has previously been validated with experiments, and further validation was performed by the authors. While the model is well understood and validated for film-wise condensation 40 on a typical hydrophilic surface, modifications to the model were performed for modeling drop-wise condensation. Two-phase flows are notoriously difficult to model, especially due to the varied nature of two-phase flows. Experimental results were, therefore, used to modify the film conduction model to represent the heat and mass transfer characteristics observed.

Several parameters of the system differ significantly in drop-wise condensation. The film conduction resistance decreases dramatically, as the droplets have much higher surface area than films 40 and also exit the system much more quickly. Drop-wise condensation has heat transfer performance 5 to 7 times higher than film conduction.

The film conduction resistance is given by the following equation:

$$q_{c,i} = \frac{k_{film,i}}{\delta_i} \cdot (T_{l,i} - T_{wall,i}),$$

where $q_{c,i}$ is the heat flux, $k_{film}$ is the conductivity of the condensate film; $\delta_i$ is the local condensate film thickness; $T_{i,i}$ is the local membrane temperature; and $T_{wall,i}$ is the local wall temperature.

A key difference between film-wise and drop-wise condensation specific to AGMD is the reduction in diffusion distance. The diffusion through the non-condensable gases in AGMD is the primary mass transfer resistance that causes AGMD to have inferior condensate production compared to membrane-distillation configurations without an air gap, such as direct-contact membrane distillation (DCMD). With droplets condensing, the diffusion resistance shrinks dramatically as the droplets protrude from the surface, approaching very close to the membrane surface.

The water vapor diffusion equation through the air gap is given as follows:

$$\left(\frac{J_i}{M_{H2O}}\right) = \frac{c_{a,i} \cdot D_{wa}}{d_{gap} - \delta_i} \cdot \ln\left(1 + \left(\frac{x_{i,i} - x_{a,m,i}}{x_{a,m,i} - 1}\right)\right),$$

where $J_m$ is the flux through the membrane 14; $M_{H2O}$ is the molecular weight of water; $c_{a,i}$ is the local concentration of air; $D_{wa}$ is the diffusivity of water in air; $d_{gap}$ is the air gap depth; $\delta_i$ is the local condensation film thickness; $x_i$ is the mole fraction of water at the vapor-liquid interface; $x_{i,i}$ is the concentration of water vapor 36 at the film-air interface; and $x_{a,m,i}$ is the local water mole fraction at the membrane interface. The subscript i refers to the current computational cell of the 1-D EES model.

As seen from the diffusion equation, reducing the air gap depth or changing conditions that effect concentration (e.g., increasing the difference in temperatures) can dramatically increase flux. This reveals why hydrophobic surfaces and superhydrophobic surfaces perform so well. In jumping-droplet configurations, droplets 42 jumping or bouncing within the gap are on average close to the membrane 14, creating a smaller effective gap. Drop-wise condensation also decreases the average distance, as the droplet sizes are often nearly that of the air gap, itself, and are large enough to span the gap for very small air gaps.

Therefore, to model drop-wise configurations, a simple modification of adjusting the air gap distance, $\delta_i$, to an average extrapolated from the experiment can roughly model the decreased diffusion resistance of drop-wise condensation.

Uncertainty Analysis:

Uncertainty quantification for the experimental results was calculated with the Engineering Equation Solver model. Uncertainties of flow rate in all three channels, pressure, dimensions, and temperature were included. The dominant sources of error were the temperatures in the feed and cooling channels and the variable condensate flux. The feed temperature dominates condensate production but had lower uncertainty due to a superior controller, so both feed and cooling uncertainties become comparable. Temperature uncertainty was conservatively calculated by using the standard deviation of temperature during the experiment plus the thermistor measurement uncertainty.

Because of slow dripping of condensate flux through the thin pipe to the mass scale, a conservative estimate was used for error of condensate flux based on the standard deviation of dripping. An uncertainty of 10 seconds was used, while the experiments ranged from 5-10 minutes.

In many cases the uncertainty was so small it may be smaller than the graphic used to denote the data points. Repeatability experiments confirmed the accuracy of the system.

Results and Analysis:

The first AGMD hydrophobicity trial performed with a small air gap (~0.7 mm) and constant cold side temperature of 13° C. showed a dramatic increase in flux with superhydrophobic condensing, especially at lower temperatures. While the flux was initially 120% higher, by 65° C. it was nearly identical to film-wise AGMD. In the trends, a clear transition is seen in superhydrophobic condensing around 65° C. It was determined that the initial regime was superhydrophobic jumping droplet condensation 42, and the later lower flux regime was flooded 46.

The CuO superhydrophobic surface was designed for partial wetting condensing, and has two observed regimes from this and previous experiments. First, superhydrophobic condensing can create small jumping droplets 42 that eject from the surface after combining with nearby drops. This mode is known to be superior, with the best heat transfer coefficients and condensation rates, as was the case here. The other mode this surface may experience is flooding 46, in which case, the regions between the microstructured roughness becomes filled with water 16. As a result, large droplet drop-wise condensation occurs, where the droplets only shed by gravity. Because of the microstructures, these droplets become highly pinned, and thus need a larger diameter (~2-3 mm) to leave the surface than is needed for smooth hydrophobic surfaces. Thermodynamically, this is similar to film-wise flooding, although the surface hydrophobicity allows for more rapid rejection of the droplets from the system.

Figure 15:
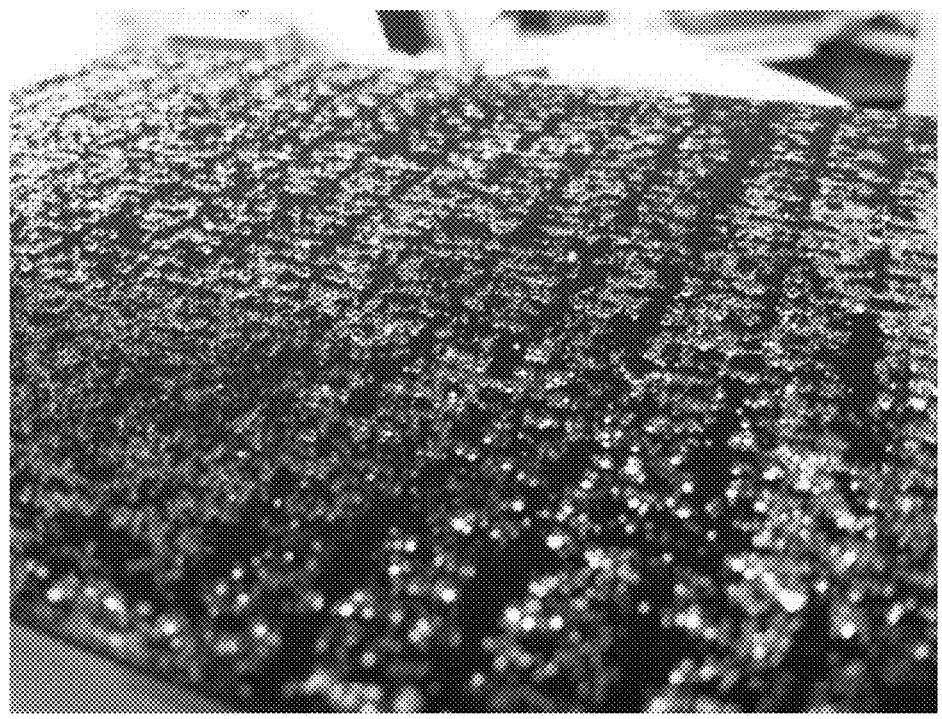
FIG. 15 is a photographic image of a partially wetted superhydrophobic surface.
Figure 16:
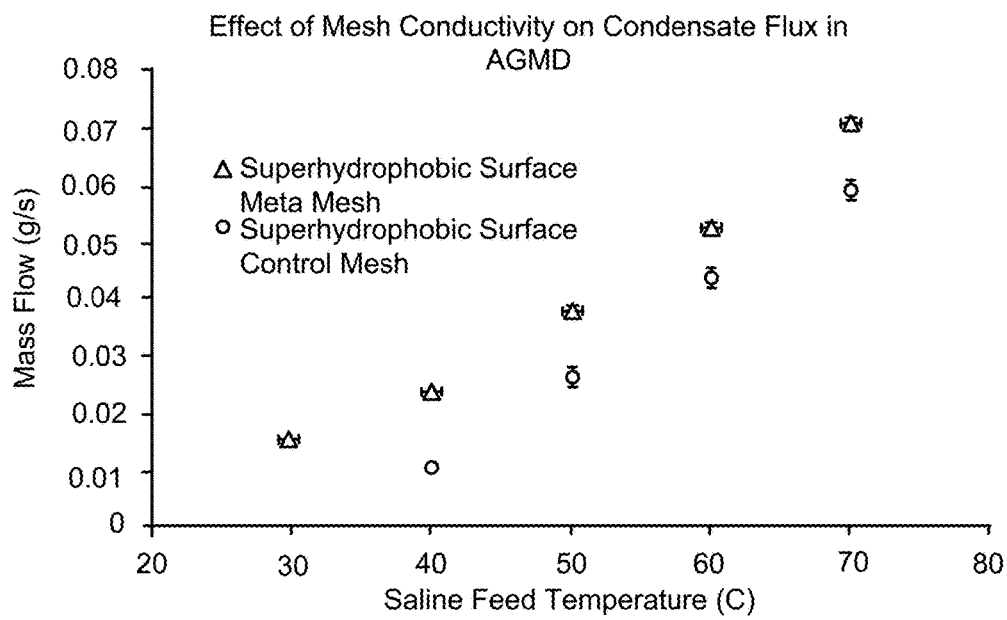
FIG. 16 is a plot showing the effect of mesh conductivity on condensate flux from an experiment involving superhydrophobic condensing with a highly conductive metal support mesh with a $\Delta T=20°$ C. between hot and cold channels. The conductivity of the stainless steel mesh was 16 W/mK, and the conductivity of the plastic support mesh was 0.2 W/mK.
Figure 17:
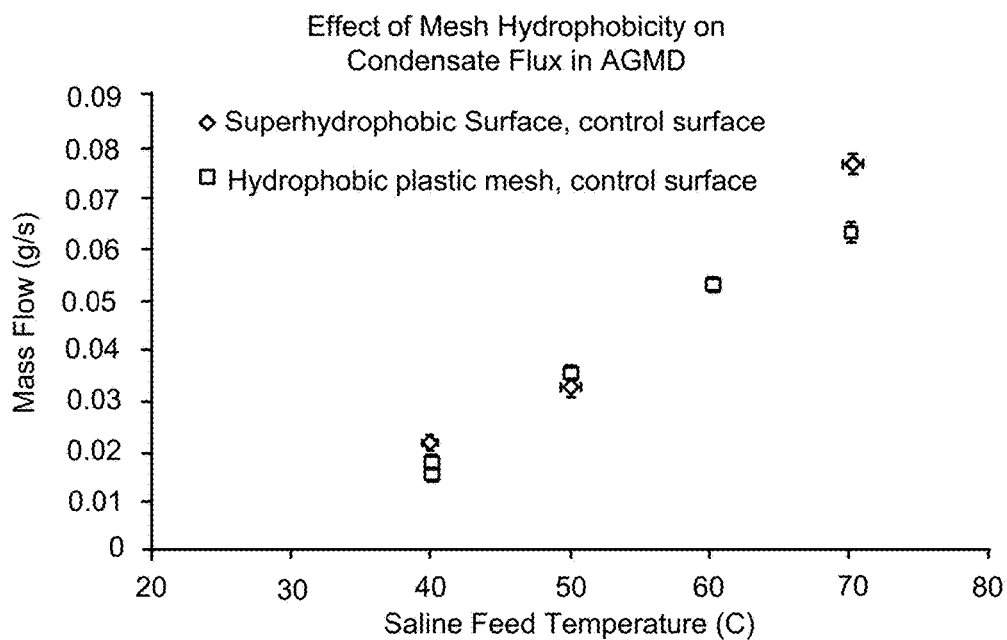
FIG. 17 is a plot showing the effect of mesh hydrophobicity on condensate flux in AGMD with an experiment involving ordinary (hydrophilic) AGMD on a copper control plate with a $\Delta T=20°$ C. between hot and cold channels.
Figure 18:
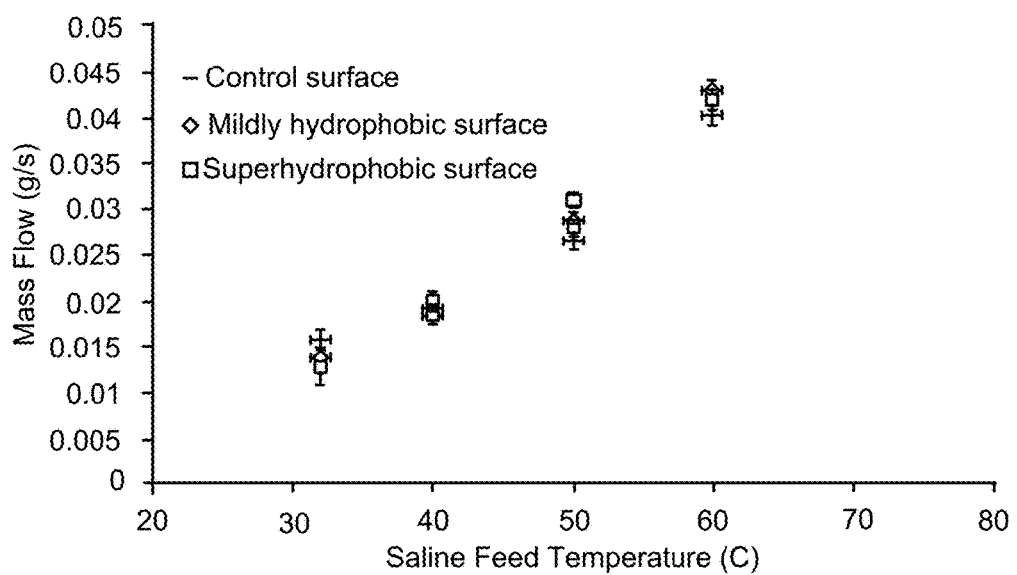
FIG. 18 is a plot showing the effect of hydrophobicity and superhydrophobicity on condensate flux in AGMD with a large air gap (1.5 mm) and a ΔT=20° C. between hot and cold channels.

The system was disassembled after the final 70° C. data point to examine the surface, which found mild flooding, as seen in FIG. 15. Flooding at the membrane 14 under high driving temperature differences was verified by an experiment that made a segment of the membrane 14 transparent via consolidating the membrane pores by melting the membrane 14.

Because of a high degree of pinning, the wetted droplets remained on the surface even when the surface was held upside down. Importantly, flooded conditions are rather nonreversible; once a surface becomes flooded, it remains that way even at conditions where flooding will not commence. Consequently, drying is often necessary to remove the wetted droplets.

Air-gap membrane distillation, and most other forms of membrane distillation, generally utilize a support structure to hold the thin hydrophobic MD membranes 14 in place. In these experiments, woven meshes were used, where ⅔ of the horizontal weaves were removed to minimally interfere with condensation phenomena. In addition to hydrophobic experiments, use of a highly conductive mesh was of interest as the air gap, itself, dominates the heat transfer resistances, with large delta T's in the air gap. The mesh, itself, thus acts to both reduce temperature polarization in the air gap, as well as acting as an additional condensing surface with a smaller average distance to the air gap. A model of a modified conductivity air gap finds good agreement with the results.

This increase in flux has a significant trade off in that the metal mesh allows for direct conduction of heat from the cold to hot channels. While it is difficult to model the complex two phase hydrophobic condensing heat transfer, a straightforward calculation of the adjusted effective conductivity of the gap can evaluate thermal losses from the metal mesh. Comparing this calculation with the experiment condensate production gives insight on the tradeoffs for this modification and, thus, insight as to the conditions under which a highly conductive support mesh is advantageous.

$$k_{gap} = k_{air} \times \left(\frac{k_{metal}}{k_{air}}\right)^{(1-\varnothing)^{0.59}},$$

where k is thermal conductivity; $k_{gap}$ is the effective conductivity of the air gap; and $\varnothing$ is the porosity.

Examining the effect of the hydrophobicity of the support mesh on condensate production was also of interest for improving AGMD systems. Most AGMD models assume the effects of the mesh are relatively small and model the system as a laminar film 40 on a flat surface. The results from the experiment verified this result, as making the mesh superhydrophobic with NEVERWET coating (from NeverWet, LLC) had a negligible effect on condensate production. A slight effect appeared at 70° C., which may be related to effects on flooded AGMD, which began occurring in the system in these conditions around 65° C.

The inventors expect that the mesh made a difference in conductivity but not hydrophobicity because the conductive mesh's conductivity was almost three orders of magnitude larger than that of the air in the gap.

An experiment was performed with a much larger air gap including mildly hydrophobic surfaces. With this much larger air gap, the effect of superhydrophobic surfaces appeared to be greatly reduced. Notably, the mildly hydrophobic surface outperformed the superhydrophobic surface at high temperature, where flooding conditions 46 begin occurring. Under flooding conditions 46, superhydrophobic surfaces have lower heat transfer rate than smooth hydrophobic surfaces. Both undergo dropwise condensation, with the superhydrophobic surface having slower moving larger drops due to a high degree of pinning from the surface roughness.

Notably, the experiment was begun at a higher temperature for the superhydrophobic trial and then decreased, meaning that the detrimental effects of flooding 46 may have continued down to lower temperatures.

Under most conditions, the mildly hydrophobic plate performed similarly to or better than the control plate but did not outperform the superhydrophobic trial, except under flooding conditions. The flux differences, however, remained relatively small. These results indicate that for larger air gaps, the beneficial condensate production effect of superhydrophobic surfaces may be reduced.

Wicking Surfaces:

In another embodiment of the apparatus, wicking surfaces are included in the air gap used to help remove fluid from the air gap. The presence of these wicking surfaces helps keep the air gap clear of water 16, which enables design for a thinner air gap, reducing the mass transfer and the transfer resistance without causing flooding 46.

Wicking relies on capillary action, inducing the liquid to flow in a desired direction because of preferential hydrophilicity. Hydrophobicity on other surfaces may help induce preferential flow in a wicking fashion.

Wicking can be applied in the AGMD system in several ways. The condensing surface 13 can have grooves of varied shapes that encourage wicking. Such grooves are especially effective if the wicking surfaces are more hydrophilic than neighboring areas of the condensing surface 13. Alternatively, structures can be added into the air gap 34 that act as wicking material, such as conductive wire or tubes. The wicking can be encouraged by a negative pressure differential where the fluid is being brought in, which can be accomplished via pumping or wiping mechanisms, or surface tension via fine features.

Droplet Pinning:

A common issue with superhydrophobic surfaces that affects jumping-droplet and droplet condensation is droplet pinning to surface features. This phenomenon essentially occurs as part of the surface becomes locally wetted. This local wetting causes water to adhere, preventing jumping droplets 42 and disabling drop-wise condensation from flowing.

There are several novel techniques as part of these methods for preventing droplet pinning. These techniques focus on pinning removal.

A primary technique for removing pinned droplets is evaporation of the pinned water. Essentially, a forced periodic dry out, where humidity of the system is reduced, may allow for evaporation. The duration needed for this time period can be determined from Fick's law of diffusion. An improvement includes forced flow of air over the surface, wherein a calculation for the mass transfer can be done using the heat and mass transfer analogy and Nusselt number correlations for the system's particular geometry. This calculation may include forced flow correlations for a flat plate or, for narrow systems, the correlations for enclosed internal flow. In the heat and mass transfer analogy, the Nusselt number is replaced with the Sherwood number, and the Prandtl number is replaced with the Schmidt number.

The forced-air dry-out technique can also be used at sufficient velocities to force droplets off the surface by applying enough pressure force to sever the bonds of pinning. This force can be calculated with drag coefficients for the appropriate shape of the droplet (often a half sphere) and calculated force for the droplet pinning location, which is a function of surface hydrophobicities and contact length of pinning.

While air dry-out techniques are superior for removing a higher percent of pinned droplets (approaching 100%), there are several downsides relative to another technique. Flooding the surface with water can rapidly remove the vast majority of pinned droplets. This occurs as the droplets coalesce into the flooded water stream 46, as rejoining the bulk has a lower associated surface energy that remaining on the surface. While air drying has the disadvantage of leaving behind dissolved salts and other particles, a brief flooding does not do so. Flooding techniques can advantageously be performed with low (ideally laminar) flow rates, as the fluid sheer may damage the manufactured hydrophobic surface. Advantageously, the flooded layer 46 is at least as thick as the capillary length of water, ~3 mm, to reduce surface tension effects.

Monitoring pinning is advantageous in removal. Measurement systems can often be paired with mathematical modeling to determine the conditions under which pinning occurs. Because the heat transfer coefficient is much better with falling droplets 44 or jumping droplets 42 than with pinned droplets, pinned conditions have larger differences in temperature. An added result is that condensation flux decreases as the mass transfer coefficient and driving temperature are both reduced. Consequently, measuring temperature and condensate flux can both be used to determine if pinning is an issue. Periodic cleaning methods can be applied with knowledge of experiments, measuring the above, and mathematical modeling.

To reduce the frequency of droplet pinning to begin with, surface properties of the material can be modified. Specifically increased hydrophobicity of the surface will reduce pinning, which can be accomplished via a rough surface texture and a coating of hydrophobic molecules.

Additionally, because the jumping droplets may have an electrical charge, an electric field can be generated to draw the jumping droplets away from the condensing surface 13. Further still, droplet pinning can be monitored by monitoring the temperature or mass flow rate in the system (where temperatures may increase in the second chamber 32 or the mass flow rate through the gap 34 may decrease with the commencement of flooding in the gap 34).

Further still, heat can be applied or generated at the condensing surface 13 (e.g., via resistive heating) to reduce condensation or to evaporate condensed vapor from the condensing surface 13 to prevent flooding on the condensing surface 13. Alternatively, heat can be supplied to the atmosphere in the gap 34 to reduce condensation or to promote evaporation at the condensing surface 13.

These techniques for reducing droplet pinning can also be used in a variety of other applications that utilize heat exchangers, such as power plants and for computer cooling, where the apparatus can be used to provide cooling at the condensing surface and droplet pinning can be likewise prevented with these methods to maintain jumping-droplet condensation conditions.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, moth, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references may or may not be included in embodiments of this invention. Still further, the components and steps identified in the Background section are integral to this disclosure and can be used in conjunction with or substituted for components and steps described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. An apparatus for air-gap distillation comprising:
a feed-liquid source including a feed liquid;
a distillation module comprising:
a) a feed-liquid chamber containing feed liquid in fluid communication with the feed-liquid source to establish a flow of the feed liquid through the feed-liquid chamber, wherein the feed-liquid chamber includes a porous material that allows vapor phase to pass through and exit the feed liquid chamber, but not liquid phase, hereafter referred to as a selectively permeable material;
b) a condensing surface maintained at a lower temperature than the feed liquid in the feed-liquid chamber, wherein the condensing surface is sufficiently hydrophobic to produce a contact angle with water of at least 90°;
c) a gap between the selectively permeable material and the condensing surface, wherein the selectively permeable material separates the feed liquid in the feed-liquid chamber from the gap; and
d) a plurality of hydrophilic spacers in the gap, the hydrophilic spacers being spaced from one another, stretching across the gap, and extending away from the condensing surface in the gap, wherein the hydrophilic spacers are in contact with the condensing surface to wick liquid condensate away from the condensing surface.

2. An apparatus for air-gap distillation comprising:
a feed-liquid source including a feed liquid;
a distillation module comprising:
a) a first feed-liquid chamber in fluid communication with the feed-liquid source, the first feed-liquid chamber including a heat-transfer plate with a condensing surface, wherein the condensing surface is sufficiently hydrophobic to produce a contact angle with water of at least 90°;
b) a conduit coupled to the first feed-liquid chamber to extract the feed liquid after the feed liquid flows through the first feed-liquid chamber;
c) a heat source configured to heat the feed liquid in the conduit;
d) a second feed-liquid chamber coupled to the conduit and configured to receive the feed liquid after the feed liquid flows through the conduit and is heated by the heat source, wherein the second feed-liquid chamber includes a selectively permeable material that allows a component of the feed liquid to pass through the selectively permeable material and exit the second feed-liquid chamber in vapor form but not in liquid form, wherein one side of the selectively permeable material faces the condensing surface of the heat-transfer plate;
e) a gap between the condensing surface and the selectively permeable material; and
f) a plurality of hydrophilic spacers in the gap, the hydrophilic spacers being spaced from one another, stretching across the gap, and extending away from the condensing surface in the gap, wherein the hydrophilic spacers are in contact with the condensing surface to wick liquid condensate away from the condensing surface; and
a condensate collection receptacle in fluid communication with the gap.

3. The apparatus of claim 2, wherein the feed liquid in the feed-liquid source comprises a volatile component and a less-volatile component.

4. The apparatus of claim 2, wherein the feed liquid in the feed-liquid source comprises water.

5. The apparatus of claim 4, wherein the feed liquid in the feed-liquid source further comprises at least one of the following: water including dissolved salts or minerals, water including suspended solute, water including suspended oil, water-alcohol mixture, and fruit juice.

6. The apparatus of claim 4, wherein the selectively permeable material has a contact angle with the water of the feed liquid of greater than 90° and allows vapor phase to pass through while preventing liquid feed from passing through.

7. The apparatus of claim 6, wherein the selectively permeable material comprises at least one of the following: a polymer membrane, a porous ceramic material, a porous carbon material, a porous metal material, and a porous graphene material.

8. The apparatus of claim 7, wherein the polymer membrane comprises at least one of the following: polyvinylidene difluoride, polytetrafluoroethylene, and polypropylene.

9. The apparatus of claim 2, wherein the condensing surface includes copper oxide.

10. The apparatus of claim 9, wherein the copper oxide is coated with a silane.

11. The apparatus of claim 10, wherein the silane is fluorinated.

12. The apparatus of claim 10, wherein the condensing surface has a rugosity greater than 2.

13. The apparatus of claim 2, wherein the condensing surface comprises a composition selected from at least one of the following: acrylics, amides, carbonates, dienes, esters, ethers, fluorocarbons, olefins, styrenes, vinyl acetals, vinyl esters, vinyl keytones, and vinylpuridine polymers.

14. The apparatus of claim 2, wherein the condensing surface is sufficiently hydrophobic to produce a contact angle with water of greater than 165°.

15. The apparatus of claim 2, wherein the condensing surface is more hydrophobic than the selectively permeable material.

16. The apparatus of claim 2, wherein the gap has a thickness, extending from the selectively permeable material to the condensing surface of less than 5 mm.

17. The apparatus of claim 2, wherein the hydrophilic spacer comprises at least one of a polymer and a metal.

18. A method for air-gap distillation, comprising:
    flowing a feed liquid through a first feed-liquid chamber of a distillation module, wherein the first feed-liquid chamber includes a condensing surface that is sufficiently hydrophobic to produce a contact angle of at least 150° with water;
    heating the feed liquid;
    flowing the heated feed liquid through a second feed-liquid chamber of the distillation module, wherein the second feed-liquid chamber includes a selectively permeable material that includes an outer surface in fluid communication with a gap between the selectively permeable material and the first feed-liquid chamber;
    permeating a vapor component from the feed liquid in the second feed-liquid chamber through the selectively permeable material into the gap between the selectively permeable material and the condensing surface;
    condensing the vapor component of the feed liquid as a jumping droplet from the condensing surface in the gap to produce a liquid condensate in the gap;
    removing the liquid condensate from the condensing surface via wicking along a plurality of hydrophilic spacers in the gap, the hydrophilic spacers being spaced from one another, stretching across the gap, and extending away from the condensing surface in the gap, wherein the hydrophilic spacers are in contact with the condensing surface; and
    removing from the second feed-liquid chamber a brine remaining from the feed liquid after the vapor component permeates through the selectively permeable material.

19. The method of claim 18, wherein the vapor component passes through pores in the selectively permeable material, while the flow of liquid-phase components from feed liquid through the pores is prevented.

20. The method of claim 18, wherein the feed liquid entering the second feed-liquid chamber is at a temperature in a range from 40° C. to 100° C.

21. The method of claim 20, wherein the feed-liquid temperature is raised using a solar heat collector.

22. The method of claim 20, wherein the feed liquid entering the second feed-liquid chamber is pressurized as its temperature is increased to a range from 100° C. to 140° C.

23. The method of claim 18, further comprising generating a below-ambient pressure in the gap when the method is performed.

24. The method of claim 23, wherein the below-ambient pressure is in a range from 10 kPa to 90 kPa absolute pressure.

25. The method of claim 18, wherein the vapor is condensed via jumping droplets.

26. The method of claim 18, wherein the vapor is condensed via drop-wise condensation.

* * * * *